(12) United States Patent
Teng

(10) Patent No.: US 8,149,720 B2
(45) Date of Patent: Apr. 3, 2012

(54) METHOD AND APPARATUS FOR QOS CONTROL

(75) Inventor: Xindong Teng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 12/508,647

(22) Filed: Jul. 24, 2009

(65) Prior Publication Data

US 2010/0067380 A1 Mar. 18, 2010

(30) Foreign Application Priority Data

Sep. 18, 2008 (CN) .......................... 2008 1 0216274

(51) Int. Cl.
*G01R 31/08* (2006.01)

(52) U.S. Cl. ........................................ 370/241; 370/252

(58) Field of Classification Search ......... 370/229–236.2, 370/241, 252, 392, 395.21
See application file for complete search history.

(56) References Cited

U.S. PATENT DOCUMENTS

| | | | |
|---|---|---|---|
| 7,496,661 B1 * | 2/2009 | Morford et al. ............. | 709/224 |
| 7,684,390 B2 * | 3/2010 | Navada et al. ............. | 370/389 |
| 2002/0136162 A1 * | 9/2002 | Yoshimura et al. ......... | 370/229 |
| 2006/0206784 A1 * | 9/2006 | Park et al. .................. | 714/776 |
| 2006/0268905 A1 | 11/2006 | Su et al. | |
| 2007/0115961 A1 | 5/2007 | Dorenbosch | |
| 2008/0069032 A1 * | 3/2008 | Liu ............................. | 370/328 |
| 2008/0095060 A1 * | 4/2008 | Yao ............................ | 370/241 |
| 2010/0067380 A1 | 3/2010 | Teng | |

FOREIGN PATENT DOCUMENTS

| | | |
|---|---|---|
| CN | 1617508 A | 5/2005 |
| CN | 1885857 A | 12/2006 |
| CN | 101364999 A | 2/2009 |
| CN | 101471858 A | 7/2009 |
| EP | 1 460 799 A1 | 9/2004 |
| WO | WO2007/059428 A2 | 5/2007 |
| WO | WO 2010/031337 A1 | 3/2010 |

OTHER PUBLICATIONS

Written Opinion of the International Searching Authority (translation) dated (mailed) Dec. 24, 2009, issued in related Application No. PCT/CN2009/073985, filed Sep. 17, 2009, Huawei Technologies Co., Ltd.

(Continued)

*Primary Examiner* — Ricky Ngo
*Assistant Examiner* — Phuongchau B Nguyen
(74) *Attorney, Agent, or Firm* — Finnegan, Henderson, Farabow, Garrett & Dunner LLP

(57) ABSTRACT

A method, an apparatus and a system for operating Quality of Service, QoS, based on stream, are provided. The method may include: delivering a Real-Time Transport Protocol, RTP, data stream feature to a forwarding plane; learning a RTP packet which is delivered by the forwarding plane conforming to the RTP data stream feature; and judging the RTP data stream to be a determined RTP data stream based on the RTP packet learned; identifying and monitoring the determined RTP data stream to obtain control strategy of QoS of the determined RTP data stream; and delivering the control strategy of the QoS of the determined RTP data stream to the forwarding plane so that the forwarding plane manipulates QoS of the determined RTP data stream based on the control strategy of QoS.

19 Claims, 5 Drawing Sheets

OTHER PUBLICATIONS

European Patent Office Communication pursuant to Article 94(3) EPC, European search opinion for Application No. 09165521.7, mailed Dec. 22, 2010, Huawei Technologies Co., LTD.
First Chinese Office Action dated (mailed) Mar. 9, 2011, issued in related Chinese Application No. 200810216274.9 Huawei Technologies Co., LTD.
Supplementary European Search Report for Application No. 09165521.7, dated Aug. 18, 2009, 13 pages.
Huawei Technologies CP., LTD, "New package "H.248.ERTP" to support periodic acquisition of QoS by Augit." International Telecommunication Union, Study period 2005-2008, Geneva Jul. 26-Aug. 2005, Question 3/16., pp. 1-6.
Huawei Technologies CP., LTD, "New package "H.248.QOSPR" to support periodic acquisition of QoS by Notify." International Telecommunication Union, Study period 2005-2008, Geneva Jul. 26-Aug. 2005, Question 3/16., pp. 1-9.
ETSI "Telecommunications and Internet Protocol Harmonization Over Networks (TIPHON) Release 3; End-to-end Quality of Service in TIPOH systems; Part 3: Signalling and control of end-to-end Quality of Service (QoS)." ETSI TS 101 329-3 V2.1.2 (Jan. 2002), pp. 1-45.
European communication pursuant to Article 94(3) EPC, dated (mailed) Sep. 17, 2010 for application No. 09 165 521.7-2416. (4 pages).
European communication pursuant to Article 94(3) EPC, dated (mailed) Dec. 19, 2009 for application No. 09 165 521.7-2416 (6 pages).
International Search Report dated (mailed) Dec. 24, 2009, for application No. PCT/CN2009/073985.
Schulzrinne et al., "RTP: A Transport Protocol for Real-Time Applications," Network Working Group, Jan. 1996, 75 pgs.
First Chinese Office Action dated (mailed) Dec. 23, 2011, issued in related Chinese Application No. 200810216274.9 Huawei Technologies Co., Ltd.

* cited by examiner

METHOD AND APPARATUS FOR QOS CONTROL

CROSS-REFERENCE TO RELATED APPLICATIONS

This application claims the benefit of Chinese Application No. 200810216274.9, filed on Sep. 18, 2008, which is hereby incorporated herein by reference in its entirety.

TECHNICAL FIELD

The present disclosure relates to the telecommunication field, and more particularly to a method and apparatus for Quality of Service (QoS) control.

BACKGROUND

The statements in this section merely provide background information related to the present disclosure and may not constitute prior art.

Real-Time Transport Protocol (RTP) is a protocol on Internet multi-media stream transmission, which was published by the Internet Engineering Task Force (IETF) as RFC1889. RTP is defined as working under the transmission conditions like one-to-one or one-to-many. The target of RTP is to provide time information and to accomplish stream synchronization. The service of RTP is mainly to provide load type identification, sequence numbering, timing location and transmission monitoring. The typical application of RTP may be established on User Datagram Protocol (UDP), Transmission Control Protocol (TCP), Asynchronous Transfer Mode (ATM) or other protocols. RTP usually could provide real time data transmission, but could not provide reliable transmission for sequential data packets, or stream control or congestion control. Usually RTP relies on RTP Control Protocol (RTCP) to provide these services.

RTCP provides administration on transmission quality, exchanging control information among present application processes. During a session of RTP, every participant delivers RTCP packet periodically, in the packet are statistic information of the sent packets and the lost packets, so that a server can dynamically change transmission rate or even payload type according to these information. When RTP and RTCP are applied cooperatively, transmission efficiency could be improved with efficient feedback and fewer overhead, which is applicable to real-time data transmission on the internet.

QoS may be defined as follows: Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important especially for real-time streaming multimedia applications such as voice over IP, online games and IP-TV, since these often require fixed bit rate and are delay sensitive, and also in networks where the capacity is a limited resource, for example in cellular data communication network.

An operator often develops streaming media QoS service according to a certain convergence ratio. In order to provide variant service, the level of users is often differentiated. A user with a higher level could get better QoS. A user with a lower level could get relevant QoS when the network is vacant or idle or with enough bandwidth. But when the network is congested, the packet of the user with the lower level may be discarded earlier than the packet of the user with the higher level; the quality of lower level service obtained then would be awful. When the bandwidth of carrier is heavier than the whole available bandwidth, and the priorities of users are the same in the mean time, all user flows might be discarded. Thus all users would encounter a delay of information, for example the showing of mosaic may come out.

SUMMARY

Consistent with some embodiments of the present disclosure QoS is controlled based on stream or flow so that certain flow or stream can be dealt with, especially discarding certain flow during network congestion.

In the embodiments, there is provided a method, an apparatus and a system for controlling QoS based on stream.

An embodiment provides a method for controlling Quality of Service (QoS) based on stream, which includes:
  delivering a Real-Time Transport Protocol (RTP) data stream feature to a forwarding plane;
  learning a RTP packet which is delivered by the forwarding plane conforming to the RTP data stream feature; and judging the RTP data stream to be a determined RTP data stream based on the RTP packet learned;
  identifying and monitoring the determined RTP data stream to obtain control strategy of QoS of the determined RTP data stream; and
  delivering the control strategy of the QoS of the determined RTP data stream to the forwarding plane so that the forwarding plane manipulates QoS of the determined RTP data stream based on the control strategy of QoS.

An embodiment further provides an apparatus for operating Quality of Service (QoS) based on stream, which includes:
  a forwarding plane, configured to communicate with a control plane; wherein
  the control plane is configured to deliver a Real-Time Transport Protocol (RTP) data stream feature to the forwarding plane; and learn an RTP packet which is delivered by the forwarding plane according to the RTP data stream feature; and judge the RTP data stream to be a determined RTP data stream based on the RTP packet learned; and
  the control plane is further configured to identify and monitor the determined RTP data stream to obtain control strategy of QoS of the determined RTP data stream; and
  the control plane is further configured to deliver the control strategy of the QoS of the determined RTP data stream to the forwarding plan;
  the forwarding plane is configured to deliver the RTP packet conforming to the RTP data stream feature which is delivered by the control plane to the forwarding plane; and
  the forwarding plane is further configured to manipulate QoS of the determined RTP data stream based on the control strategy of the QoS.

An embodiment provides a system for operating Quality of Service (QoS) based on stream, which includes:
  a control device, configured to communicate with a forwarding device; wherein
  the control device is configured to deliver a Real-Time Transport Protocol (RTP) data stream feature to the forwarding device; and learn an RTP packet which is delivered by the forwarding device according to the RTP data stream feature; and judge the RTP data stream to be a determined RTP data stream based on the RTP packet learned; and the control device is further configured to identify and monitor the determined RTP data stream to obtain control strategy of QoS of the determined RTP data stream; and the control device is further configured to deliver the control strategy of the QoS of the determined RTP data stream to the forwarding device so that the forwarding device manipulates QoS of the determined RTP data stream based on the control strategy of the QoS.

Other systems, methods, features and advantages of the disclosed embodiments will be, or will become, apparent to one with skill in the art upon examination of the following figures and detailed description. Some of such additional features and advantages of the embodiments will be described hereinafter which form the subject of the claims of this disclosure. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the disclosure as set forth in the appended claims.

BRIEF DESCRIPTION OF THE DRAWING(S)

The drawings described herein are for illustration purposes only and are not intended to limit the scope of the present disclosure in any way.

DETAILED DESCRIPTION

Figure 1:
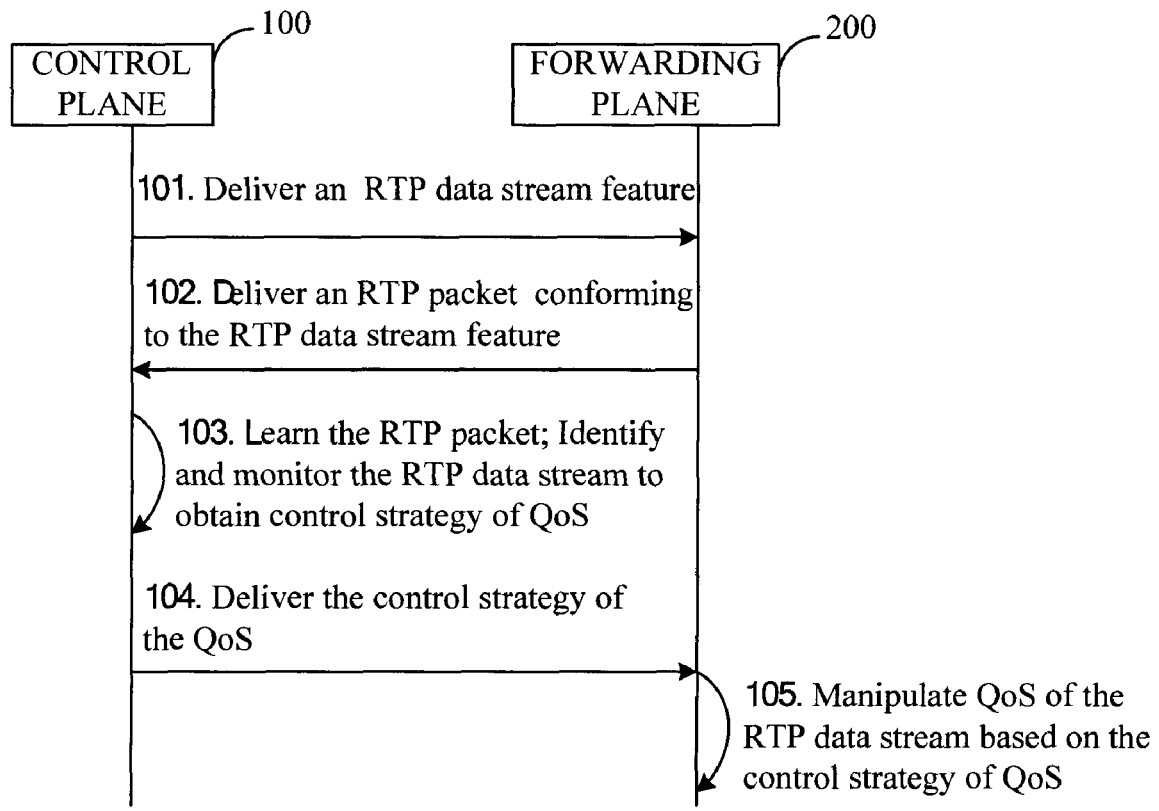
FIG. 1 is a flow chart of an embodiment for operating QoS based on stream.

Further areas of applicability will become apparent from the description provided herein. It should be understood that the description is merely exemplary in nature and are not intended to limit the scope of the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

By identifying the media stream of user in order to operate QoS based on the media stream of user, and during network congestion, only the data flow or data stream of certain users would be discarded, while the data flow or data stream of other users would not be even impacted. There are mainly two ways to accomplish this idea: one is to monitor media stream control protocol to identify specific data stream through a router; the other one is to monitor stream control protocol to obtain a quintet of parameters group information of the stream through a network gateway, for example Session Border Controller, then the network gateway deliver to a router a control strategy based on the quintet of parameters group information through a cooperation protocol so that the control strategy may be operated on the QoS. The media stream control strategy may be for example H.323 etc. The quintet of parameters group information probably includes source IP address, target IP address, source port number, target port number and/or protocol number.

But a router usually is not a protocol gateway. The CPU of the router mainly works on maintenance on routing protocol. If it is through router to identify stream by monitoring the signal protocol and to operate QoS based on the stream, the router may need to support complicated signalling protocols, which may cause heavy workload and complicated data flow operation, thus the efficiency may be negatively impacted. If it is through a network gateway to operate QoS based on stream, multiple types of devices may be needed to be deployed, and the router and the network gateway may need to support cooperation protocol in order to work cooperatively. Thus the network may be rather complicated; furthermore, the devices in the network may need high capabilities.

RTCP mainly provides four basic functions:

One function of RTCP is to gather statistics on quality aspects of the media distribution during a session and transmit this data to the session media source and other session participants. Such information may be used for congestion control; and such information may be used by the source for adaptive media encoding; and such information may permit session quality monitoring and detection of transmission faults.

Another function is that the RTCP provides canonical endpoint identifiers, for example, Canonical Name (CNAME), to all session participants. A source identifier, for example, a Synchronous Source (SSRC) of an RTP stream, may change during a session when conflicts occur or the procedure is updated and restarted. The CNAME provides an identification of end-points across an application instance. During a session, receivers can obtain relevant data stream, for example audio or video, by receiving the CNAME identifiers of the participants.

Another function is that the transmitting frequency of RTCP report is adjusted according to the number of participants.

Another function is that the session control information is sent, for example, to show an identifier of a participant at an end-point port.

To set up an RTP session, The RTP protocol receives media stream, for example H.263, from an upper level, and then adds a header to the RTP protocol to pack up an RTP data packet and then deliver the RTP data packet to a lower level. The protocol of lower level provides divisions of RTP and RTCP. For example, in protocol UDP, an RTP port number is even, and then the corresponding RTCP port number is the following odd port number. The length of RTP data packet is not limited; the longest length of the packet is limited by the lower level protocol the RTP uses.

The RTP header has a fixed format, often with a size of 12 bytes. Receivers and senders encode and decode the audio and video according to the format. The RTP may not define exact protocol feature code or value. Receivers and senders determine the RTP report or packet according to port number obtained by protocol negotiations, for example H.323.

The fields in the header are as follows:

| V | P | X | CSRC Count | M | Payload type | Sequence number |
|---|---|---|---|---|---|---|
| Timestamp | | | | | | |
| Synchronization Source (SSRC) | | | | | | |
| Contributing source (CSRC: variable 0-15 items, 2 octets each) | | | | | | |

V: (2 bits) Indicates the version of the protocol. The current version is 2.
P: (1 bit) Used to indicate if there are extra padding bytes. 0 indicates that there is no padding byte, 1 indicates that there is padding byte.
X (Extension): (1 bit) Indicates presence of an Extension header. 0 often indicates there is no extension header, 1 indicates there is extension header.
CC (CSRC Count): (4 bits) Contains the number of CSRC identifiers that follow the fixed header.
M (Marker): (1 bit) if it is set, it means that the current data has some special relevance for the application, for example a marker is used to identify there is a frame boundary in the stream.
PT (Payload Type): (7 bits) Indicates the format of the payload. Indicates for example the format of the payload of an RTP, for example G.711 audio coded data.
Sequence Number (SN): (16 bits) Indicates the delivering order of the division. The initial value of the sequence number is a random value. For example the sequence number is incremented by one for each RTP data packet sent and is to be used by the receiver to detect packet loss and to restore packet sequence.
Timestamp: (32 bits) Used to identify sampling time of the first byte of RTP data packet, to restore the original time sequence of audio or video, and to help the receiver to determine the change or consistency of the time of data arrival. The initial value may be a random value, and incremented at different rates according to different payloads.
SSRC: (32 bits) Synchronization source identifier uniquely identifies the data source of the RTP packet. The synchronization sources within the same RTP session will be unique. It helps the receiver to differentiate simultaneous streams from each other.
CSRC: (32 bits) Contributing source IDs enumerate contributing sources to a stream which has been generated from multiple sources. A CSRC ID may be inserted by a mixer. A header of an RTP packet may at most include 15 CSRC IDs, the number of which is identified by the CC field.

In the embodiments, there is provided a method, a device and a system for controlling QoS based on stream, for example during network congestion, only the data flow or data stream of certain users would be discarded, while the data flow or data stream of other users would not be even impacted. Provided by the method, apparatus or the system, complicated signalling protocols would not be needed, and it may save deploying a plurality of types of apparatuses.

FIG. 1 is a simplified flowchart of an embodiment of a method for operating QoS based on stream. A method of an embodiment may be illustrated from FIG. 1 as follows:

delivering a Real-Time Transport Protocol, RTP, data stream feature to a forwarding plane; learning a RTP packet which is delivered by the forwarding plane conforming to the RTP data stream feature; and judging the RTP data stream to be a determined RTP data stream based on the RTP packet learned; identifying and monitoring the determined RTP data stream to obtain control strategy of QoS of the determined RTP data stream; and delivering the control strategy of the QoS of the determined RTP data stream to the forwarding plane so that the forwarding plane manipulates QoS of the determined RTP data stream based on the control strategy of QoS.

A method of another embodiment may be illustrated from FIG. 1 as follows:

101: A control plane 100 delivers an RTP data stream feature to a forwarding plane 200.

A control plane 100 may be a control device; a forwarding plane 200 may be a forwarding device or data plane or transport plane. As for digital communication devices, for example a router, the architecture of the router usually includes a control plane and a forwarding plane. The forwarding plane commonly includes hardware or chip of a lower layer, and is mainly configured to store a table for data transferring or forwarding. After the data packet is received at the interface, the forwarding plane looks up the table and forwards the data packet rapidly. The control plane commonly includes software program which may be executed by a CPU, and is mainly configured to process network protocols or configuration information. The control plane generates or organizes relevant forwarding entries to send to the hardware to supervise the forwarding.

The RTP data stream feature delivered by the control plane is configured to identify whether a forwarding data stream is an RTP data stream by the forwarding plane. The RTP data stream feature may be delivered by a format of a feature template. The feature template may include three types of the following. Commonly only one feature template is delivered each time, but it is also possible that the combined template of two or three feature templates may also be delivered and two or more feature templates or the combination of the feature templates may also be delivered each time.

(1) A first feature template: a plurality of bytes of the RTP data stream, wherein the plurality of bytes comprise UDP type value and version number of RTP header, or TCP type value and version number of RTP header.

The first feature template may be further described as follows: to deliver the first N bytes of the RTP data stream, wherein, setting N<=128 preferably to be operated and also to deliver the following content but not limited: UDP protocol type value+version number of RTP header, or TCP protocol type value+version number of RTP header.

After receiving the RTP data stream feature delivered according to the first feature template, the forwarding plane may identify the RTP data stream based on that if the received data stream matches the value of the feature delivered. The matching may be set as the matching of the whole fields or part of the fields. When the matching of the whole fields is set, all bytes delivered are matched; when the matching of a part of the fields is set, only a part or some of the fields be matched, the bytes that do not need to be matched may be specified by an internally defined value, for example "0".

(2) A second feature template: port number of UDP or TCP, wherein the port number is adapted to determine the RTP data stream.

The second feature template may be further described as follows: to deliver a port number of a certain scope, the scope is commonly set as an even number port in 16384~32767. When RTP is used on UDP or TCP, the destination port is commonly an even number port from 16384 to 32767.

Receiving the RTP data stream feature delivered according to the second feature template, the forwarding plane may identify the data stream as the RTP data stream when a destination port of the data stream received is the destination port among the scope of above mentioned.

(3) A third feature template: Access Control List (ACL) entry, wherein the ACL entry is adapted to determine the RTP data stream.

The third feature template may be further described as follows: to deliver ACL entry to the forwarding plane, wherein the ACL may include a quintet of parameters group information, or may include second layer head information of the packet.

Receiving the RTP data stream feature delivered according to the third feature template, the forwarding plane may identify the data stream as the RTP data stream when the data stream matches the ACL entry.

When the control plane delivers the RTP data stream feature, the control plane delivers also the number of template and contents to the forwarding plane.

102: The forwarding plane replicates an RTP packet conforming to the RTP data stream feature and delivers the RTP packet to the control plane. The forwarding plane delivers the original RTP packet as normal.

When the forwarding plane receives a data stream, the forwarding plane matches the data stream with the RTP data stream feature, and when the result of matching is yes, the forwarding plane adds a mirror symbol to the RTP packet, replicates the RTP packet with the mirror symbol and delivers the RTP packet to the control plane, and delivers the original RTP packet as in a common flow. Preferably, it is not necessary that the forwarding plane delivers all the RTP packets to the control plane; the forwarding plane may deliver the packet with the RTP header, for example, a packet of fixed length of 128 bytes.

Additionally to deliver a large quantity of packet to the control plane may burden the control plane, so the forwarding plane delivers RTP packet to the control plane with a control of Committed Access Rate (CAR), which is to configure an allowable bandwidth for delivering, and discard the packet when the packet exceeds the allowable bandwidth.

103: The control plane learns the packet delivered by the forwarding plane, identifies and monitors the RTP data stream.

Figure 2:
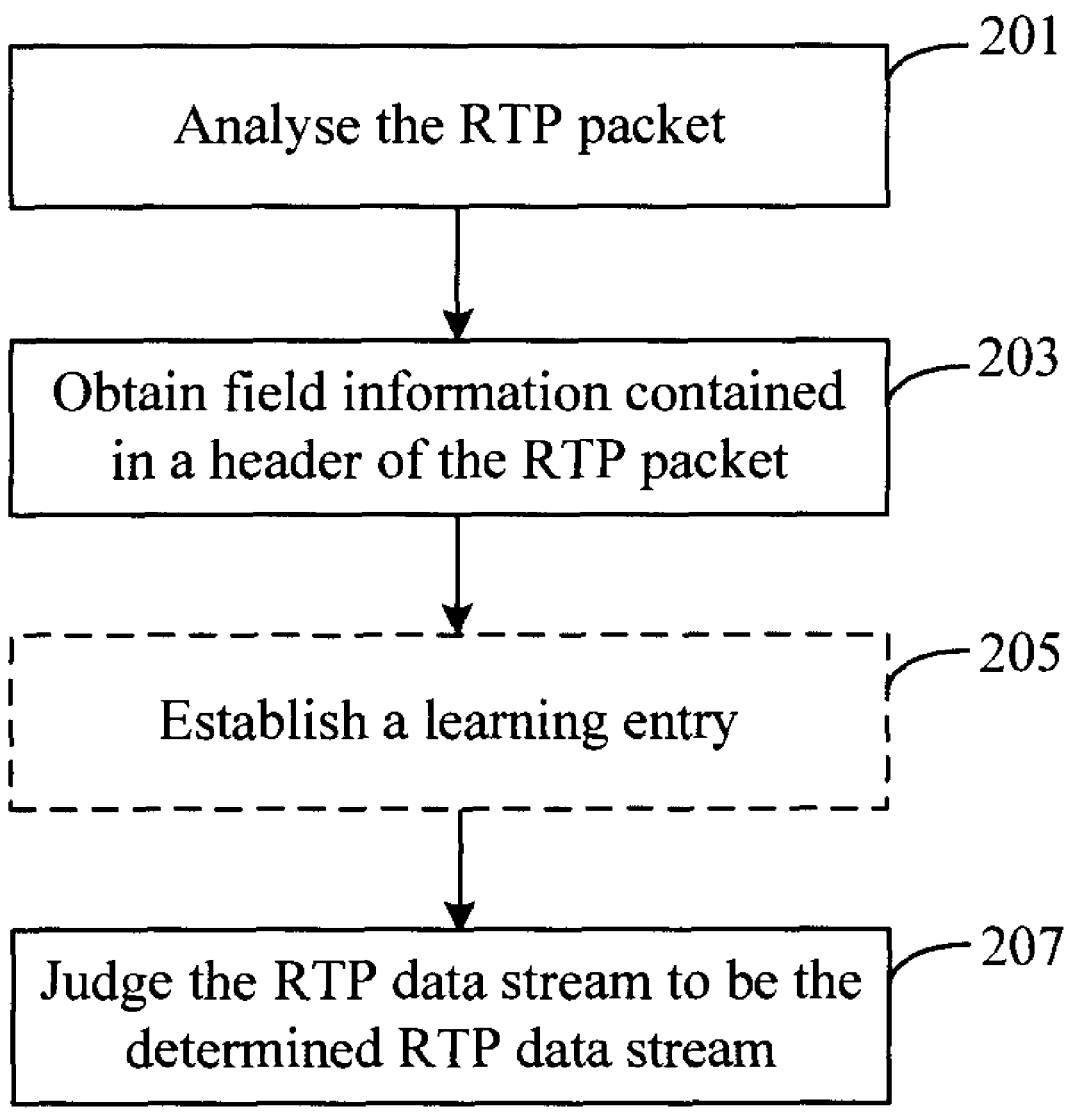
FIG. 2 is a flow chart of another embodiment for operating QoS based on stream.

The control plane learns the packet delivered by the forwarding plane conforming to the RTP data stream feature as described above in 101, wherein the process may be described further referring to FIG. 2:

201: The RTP packet which is delivered by the forwarding plane is analyzed;

203: The field information contained in a header of the RTP packet is obtained;

207: It is judged whether the RTP data stream is the determined RTP data stream based on the field information.

Before step 207, the flow may further include the following steps.

205: A learning entry is established.

An embodiment referring to FIG. 2 may also be described further as follows: The control plane analyzes the RTP packet delivered by the forwarding plane based on the RTP protocol, obtains the field information from the header of the RTP, establishes a learning entry, and judges based on the above information which packets belong to a same RTP data stream. The way of judging may be based on the RTP protocol format feature; for example, when conforming to the five conditions as followed at the same time, the packets may be judged to belong to the same RTP data stream.

The five conditions may be as follows:

(1) the version number V of RTP is a fixed value as 2;

(2) the payload type PT value of RTP remains unchanged, for example from 9~15 bit.

(3) the SN value of RTP packet: the SN value of a next RTP packet is obtained by incrementing the SN value of the preceding RTP packet by one.

(4) the Timestamp value of RTP packet is increasing;

(5) the SSRC value of RTP packet is fixed.

Figure 3A:
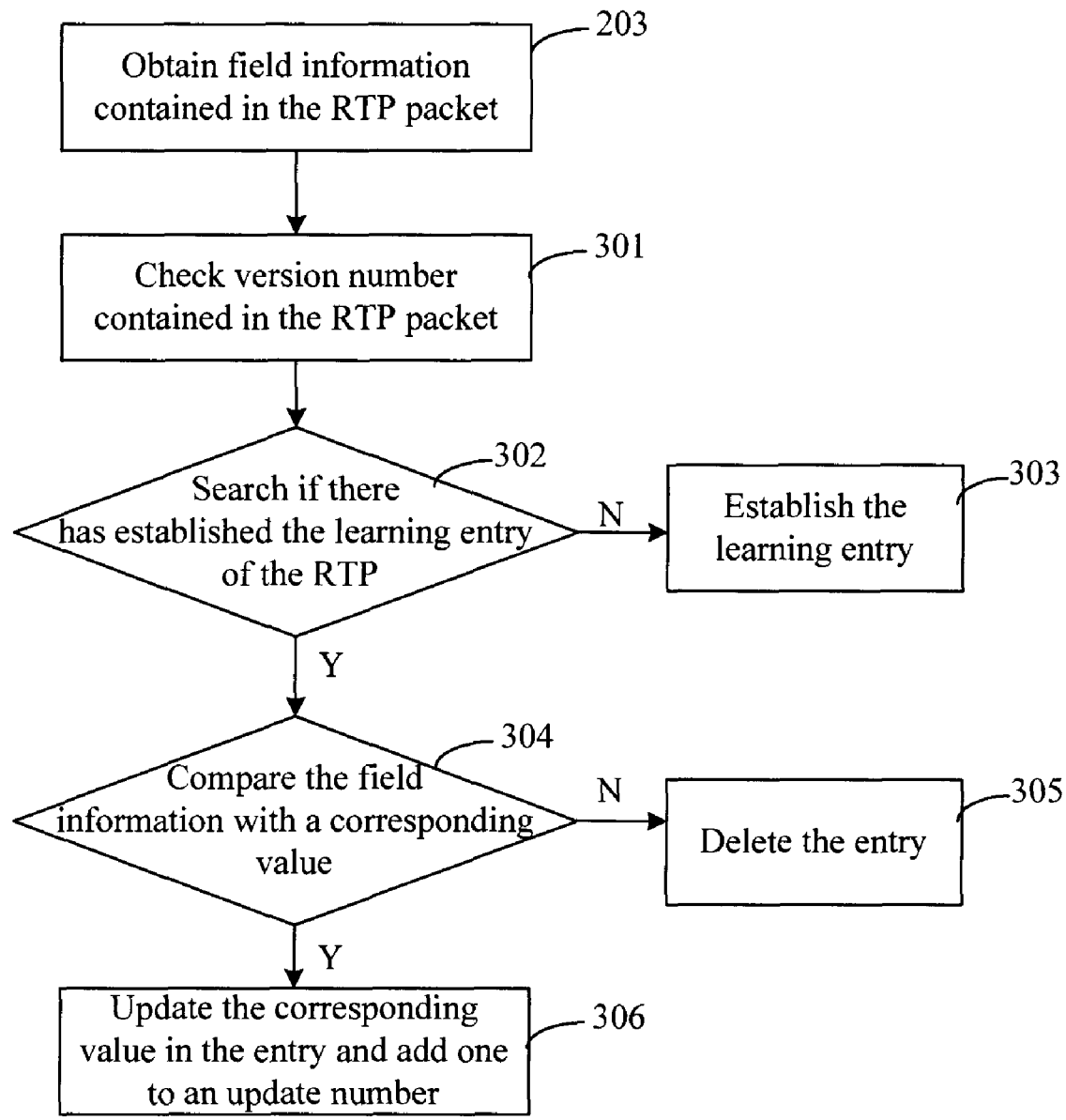
FIG. 3A is a flow chart of another embodiment for operating QoS based on stream.

After step 203 according to FIG. 2, the learning process may be described with reference to FIG. 3A.

301: checking the version number contained in the RTP packet that the forwarding plane delivers to the control plane;

302: when the version number conforms to a preset value, searching if there has established the learning entry of the RTP data stream with the version number in the control plane;

303: if no, then establishing the learning entry of the RTP data stream with the version number, and storing the field information correspondingly, and setting an update number as an initial number; wherein the update number may be times of updating; or

304: if yes, then comparing the field information with a corresponding value in the entry according to a preset rule;

305: when the comparison result is no, deleting the searched learning entry;

306: when the comparison result is yes, updating the corresponding value in the entry, and adding one to an update number; and judging the RTP data stream to be the determined RTP data stream when the update number reaches a determining threshold.

The control plane learns the packet delivered by the forwarding plane may also be further described as follows:

The process of learning may include: to establish a learning entry, to update a learning entry, to confirm a learning entry, and/or to age a learning entry, wherein, (1) To establish a learning entry:

the control plane obtains field information of a header of the RTP packet, checks the version number is 2 or not: if not, the RTP packet would be determined as an illegal packet which may be discarded; if yes, the control plane searches a learning entry with an index of a combination of PT value with SSRC value. When the control plane does not find a learning entry to be searched, the control plane establishes a learning entry, and stores the SN value and Timestamp value into the new entry. The new entry may also store a quintet of parameters information of the RTP packet, and may also be set an aging timestamp and the number of updating. The aging timestamp may be set as a current time, the time of the entry being established, and the number of updating may be set as one;

(2) To update a learning entry:

In the above process of establishing a learning entry, when searching a learning entry with an index of a combination of PT value with SSRC value, if the learning entry is found, then comparing the SN value and Timestamp value in the RTP packet delivered by the forwarding plane with the corresponding values in the entry, when the former value is greater than the latter value, and when the quintet of parameters information is same as the quintet of parameters information in the entry, then updating the SN value and Timestamp value in the entry, and adding the updating number by one; also updating the aging timestamp to the current time, wherein the current time may be set as follows: for example checking the time of the forwarding plane delivering the RTP data stream, setting this time as the current time.

In the above process of establishing a learning entry, when searching a learning entry with an index of a combination of PT value with SSRC value, if the learning entry is found, then comparing the SN value and Timestamp value in the RTP packet delivered by the forwarding plane with the corresponding values in the entry, when the former value is not greater than the latter value, or when the quintet of parameters information is not the same as the quintet of parameters information in the entry, then deleting the learning entry which was found for the learning entry may be illegal.

(3) To confirm a learning entry:

When the updating number reaches a threshold, then the data stream which the entry is related to is judged to be a determined RTP data stream. The threshold may be configured, for example as five or five times.

Additionally an aging process may be configured in order to solve the issue that an entry has not received a packet for a long time and the entry occupies the memory of the control plane. The aging process may be, for example, checking the learning entry and deleting the learning entry if it is not updated for a certain period. We may call this process as a process to age a learning entry. The process may be done by an aging timer which is a periodic timer and may be configured to be initiated when QoS operation based on stream is activated.

Figure 3B:
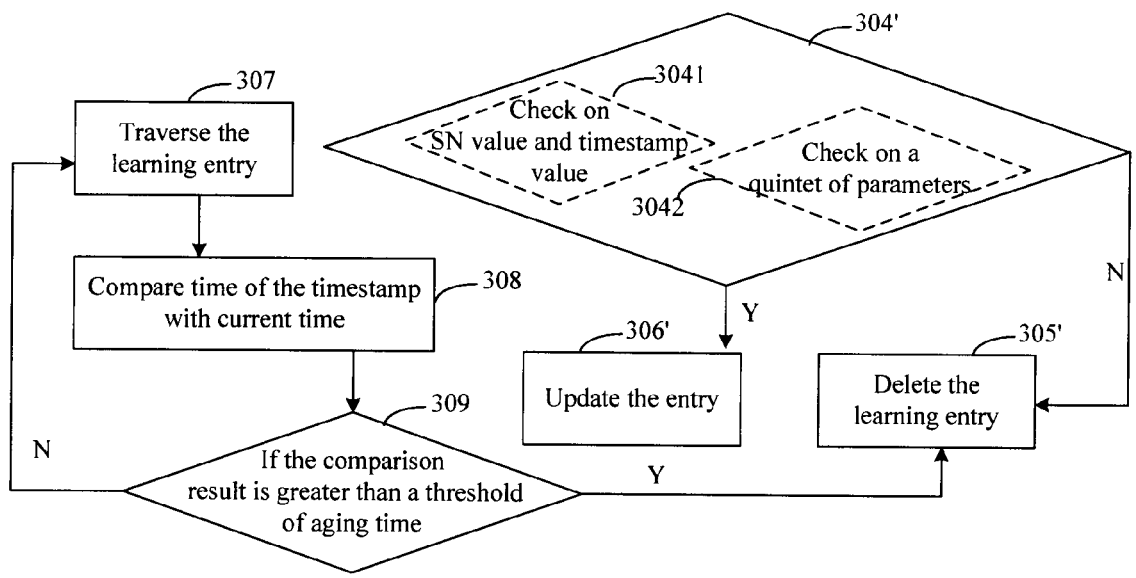
FIG. 3B is a flow chart of another embodiment for operating QoS based on stream.

Referring to FIG. 3B, when the periodic timer expires when the period of the periodic timer comes, i.e. when the learning entry is not updated for a certain period, an embodiment of the method of operating QoS based on stream may further include the following:

307: traversing the learning entries;

308: comparing time of the timestamp with current time of the traversing process;

309: if the comparison result is greater than a threshold of aging time,

305': deleting the learning entry; otherwise go to 307 to traverse a next learning entry.

The control plane checks the learning entry and deletes the learning entry if it is not updated for a certain period, which may also be described further as follows:

When the periodic timer expires, all the learning entries that need to be traversed are all traversed, and it is also checked that if the entries need to be aged. For example, when traversing a first entry, the aging timestamp of the entry is compared with the current time, wherein the current time is the time of traversing the entry. If the interval between the aging timestamp of the entry and the current time is greater than an aging time threshold, the entry is considered as needing to be aged, then deleting the entry; and traversing a next learning entry, repeating the process above until all learning entries need to be traversed are traversed. When the period of the periodic timer comes, a certain quantity of learning entries may be traversed for one time, for example 500; and when the period of the periodic timer comes once more, a certain quantity of learning entries may be traversed this time, and the process continues till all the learning entries are traversed.

Figure 4:
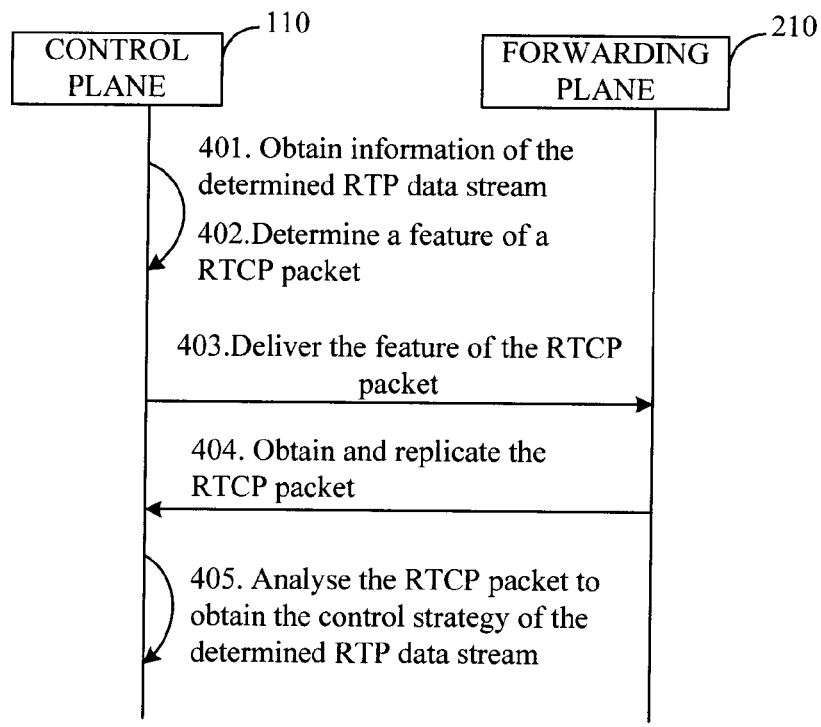
FIG. 4 is a flow chart of another embodiment for operating QoS based on stream.

Referring to step 103 in FIG. 1, the control plane learns the packet delivered by the forwarding plane, identifies and monitors the RTP data stream. Referring to FIG. 4, the process that the control plane identifies and monitors the RTP data stream process may further include: obtaining information of the determined RTP data stream; determining a feature of a RTCP packet corresponding to the determined RTP data stream; delivering the feature of the RTCP packet to the forwarding plane; when the RTCP packet from the forwarding plane conforming to the feature is received, analyzing the RTCP packet to obtain the control strategy of the determined RTP data stream; wherein the RTCP packet is obtained and replicated by the forwarding plane according to the feature.

Also refer to FIG. 4, the process that the control plane identifies and monitors the RTP data stream process may be further described as follows:

401: the control plane 110 obtains information of the RTP data stream learned;

The control plane 110 learns the RTP packet delivered by the forwarding plane 210. When a learning entry is confirmed, an RTP data stream is determined. The control plane 110 then may obtain a quintet of parameters group information and other information of the determined RTP data stream, for example Type of Service (ToS), egress, ingress, etc.

402: the control plane 110 determines a feature value of an RTCP packet corresponding to the RTP data stream;

Based on the information obtained as described in step 401, the feature value of the RTCP packet corresponding to the RTP data stream may be determined accordingly. The feature value of the RTCP packet mainly includes a destination port number. For example, in UDP and TCP, the destination port number of the RTP data stream is commonly an even number port, the destination port number of the corresponding RTCP packet may be obtained by adding one to the even number.

403: The control plane 110 delivers the feature value of the RTCP packet to the forwarding plane 210, may include the destination port number of the RTCP packet.

404: The forwarding plane 210 captures the RTCP packet, replicates the RTCP packet and delivers the replicated RTCP packet to the control plane 110.

405: The control plane 110 analyzes the RTCP packet delivered by the forwarding plane 210, and obtains control information on the RTP data stream correspondingly. The control information may be a control strategy on QoS of the RTP data stream.

Refer to FIG. 1, after step 103, an embodiment of a method for operating on QoS based on stream may further include the following steps:

104: the control plane 100 delivers the control strategy of the QoS of the determined RTP data stream to the forwarding plane 200;

According to step 103, the control plane 100 may monitor the RTP data stream. In order to operate QoS on the RTP data stream, the QoS strategy of the RTP data stream needs to be delivered to the forwarding plane 200. Before the QoS strategy of the RTP data stream is sent, the QoS strategy is to be determined first. The approaches to determine the QoS strategy of the RTP data stream may be described as follows:

(1) The control plane 100 outputs the monitored RTP data stream to a user; the user determines the QoS strategy of the RTP data stream. For example, the user determines the QoS strategy by configuration, as whether to discard the RTP data stream, or to modify the priority, or modify the bandwidth etc.

(2) The control plane 100 determines the QoS strategy of the RTP data stream automatically. For example, the previously established RTP data stream may have a higher priority, and a bandwidth guarantee priority; the RTP data stream that is established later may be discarded firstly during congestion. For another example, the QoS strategy may be configured based on users, for example based on VLAN, interface, VPN etc to reset priority. The forwarding plane may schedule according to the priority. For the bandwidth, the user with higher priority may be guaranteed first during congestion, whereas the user flow with lower priority may be discarded first. The modification of the priority of the users may be done by presetting. In a default condition, the user who establishes a RTP data stream earlier commonly has a higher priority.

The determining by the control plane 100 the QoS control strategy of the RTP data stream may be further controlled by the entry of the QoS control strategy by user's configuration of threshold, for example, discard the RTP data stream which occupies a certain percentage or quantity, discard the RTP data stream with more than 10 percent, discard the RTP data stream with quantity of 30, or degrade the priority, etc. When degrading occurs, if a data stream with higher priority ages, the data stream that has been degraded may be restored to its original grade of priority so that the network bandwidth may be efficiently used.

The control plane 100 delivers the control strategy of the QoS of the determined RTP data stream to the forwarding plane 200 when the control strategy of the QoS is determined.

Referring to FIG. 1, an embodiment of operating on QoS based on stream may further include:

105: The forwarding plane 200 manipulates QoS of the determined RTP data stream based on the control strategy of QoS of the RTP data stream.

The forwarding plane 200 obtains the control strategy of the QoS of the determined RTP data stream, and forwards the RTP data stream according to the control strategy of the QoS.

For example, matching the RTP data stream with the ACL entry in the forwarding plane 200, the stream matched may be operated according to the control strategy in the ACL entry, which may include: discarding, remarking the priority of the stream and scheduling the stream according to the new priority, limiting the rate according to the bandwidth defined in the entry, etc. With the data stream that has been operated according to the control strategy of QoS, the data with high priority may be forwarded first when the bandwidth permits and the bandwidth of the stream may be guaranteed according to the strategy.

Various embodiments of the present disclosure provide a method for QoS control based on stream, which may be identified easily without complicated signalling protocol support and save the deployment of various types of apparatus. Thus may help the operator to provide service with a rather low cost. Furthermore it may help the operator to provide hierarchical service and different service in classification.

Figure 5:
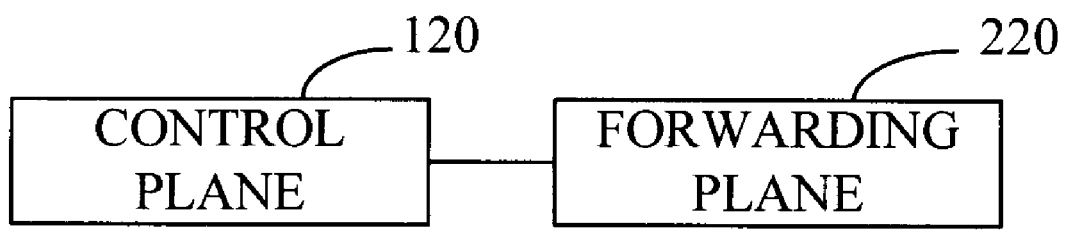
FIG. 5 is a brief diagram of an embodiment for operating QoS based on stream.

Referring to FIG. 5, an embodiment of an apparatus for operating QoS based on stream may include:

a forwarding plane 220, configured to communicate with a control plane 120; wherein, the control plane 120 is configured to deliver an RTP data stream feature to the forwarding plane 220; and learn an RTP packet which is delivered by the forwarding plane 220 according to the RTP data stream feature; and judge the RTP data stream to be a determined RTP data stream based on the RTP packet learned; and the control plane 120 is further configured to identify and monitor the determined RTP data stream to obtain control strategy of QoS of the determined RTP data stream; and the control plane 120 is further configured to deliver the control strategy of the QoS of the determined RTP data stream to the forwarding plane 220;

the forwarding plane 220 is configured to deliver the RTP packet conforming to the RTP data stream feature which is delivered by the control plane 120 to the forwarding plane 220; and the forwarding plane 220 is further configured to manipulate QoS of the determined RTP data stream based on the control strategy of the QoS.

The apparatus for operating QoS based on stream may further include: the forwarding plane 220 is further configured to add a mirror symbol to the RTP packet which conforms to the RTP data stream feature by the forwarding plane 220; and replicate the RTP packet with the mirror symbol to the control plane 120; and transfer the original RTP packet.

The apparatus for operating QoS based on stream may further include: the control plane 120 which is further configured to analyse the RTP packet which is delivered by the forwarding plane 220; and obtain field information contained in a header of the RTP packet; and judge the RTP data stream to be the determined RTP data stream based on the field information.

The apparatus for operating QoS based on stream may further include the following:

after the control plane 120 obtains field information contained in the header of the RTP packet, the control plane is further configured to establish a learning entry; wherein the control plane 120 is further configured to check version number contained in the RTP packet; and when the version number conforms to a preset value, search if there has established the learning entry of the RTP data stream with the version number;

if no, then establish the learning entry of the RTP data stream with the version number, and store the field information correspondingly, and set an update number as an initial number; or if yes, then determine whether the field information is the same with a corresponding value in the entry according to a preset rule; when the comparison result is yes, update the corresponding value in the entry, and add one to an update number; when the comparison result is no, delete the entry; judge the RTP data stream to be the determined RTP data stream when the update number reaches a determining threshold.

Figure 6:
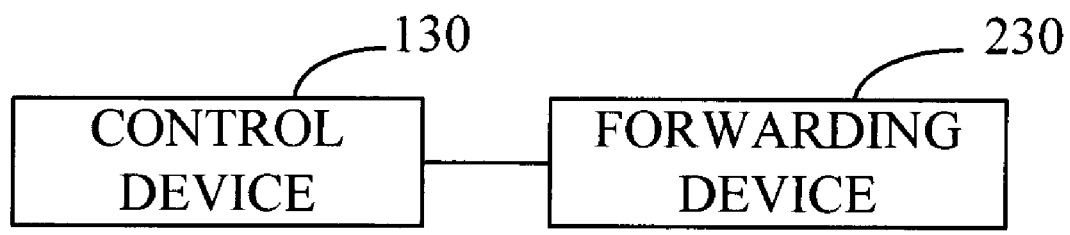
FIG. 6 is a brief diagram of another embodiment for operating QoS based on stream.

Referring to FIG. 6, an embodiment of a system for operating QoS based on stream may include: a control device 130, configured to communicate with a forwarding device 230; wherein the control device 130 is configured to deliver an RTP data stream feature to the forwarding device 230; and learn an RTP packet which is delivered by the forwarding device 230 according to the RTP data stream feature; and judge the RTP data stream to be a determined RTP data stream based on the RTP packet learned; and the control device 130 is further configured to identify and monitor the determined RTP data stream to obtain control strategy of QoS of the determined RTP data stream; and the control device 130 is further configured to deliver the control strategy of the QoS of the determined RTP data stream to the forwarding device 230 so that the forwarding device 230 manipulates QoS of the determined RTP data stream based on the control strategy of the QoS.

Another embodiment of a system for operating QoS based on stream may further include the following: the control device 130 which is further configured to analyze the RTP packet which is delivered by the forwarding device 230; obtain field information contained in a header of the RTP packet; and judge the RTP data stream to be the determined RTP data stream based on the field information.

The various embodiments of the preceding method may also be complemented analogously in the embodiment of the apparatus and/or the system correspondingly. For example, the process described above in the embodiments of the present disclosure operated by the control plane 100 may be correspondingly operated by the control plane 110, the control plane 120, or the control device 130; the process described above in the embodiments of the present disclosure operated by the forwarding plane 200 may be correspondingly operated by the forwarding plane 210, the forwarding plane 220, or the forwarding device 230 and vice versa.

The various embodiments of the present disclosure provide a method, apparatus and system for operating QoS based on RTP data stream so that certain flow or stream can be dealt with, especially discarding certain flow during network congestion. For example, a user's data stream based on a control strategy on that user's data stream or that user is discarded, whereas other user or the data streams of other users' would not be impacted. The above mentioned "flow" may be data flow, or user flow, or data stream as a skilled person in the art would know without undue burden.

Various embodiments of the present disclosure provide the method for QoS control based on stream, which may be identified easily without complicated signalling protocol support, and may save the deployment of various types of apparatus. Thus may help the operator to provide service with a rather low cost. Furthermore it may help the operator to provide hierarchical service and different service in classification.

Though illustration and description of the present disclosure have been given with reference to preferred embodiments thereof, it should be appreciated by persons of ordinary skill in the art that various changes in forms and details can be made without deviation from the scope of this disclosure, which are defined by the appended claims.

What is claimed is:

1. A method for operating Quality of Service (QoS) based on stream, comprising:
   delivering a Real-Time Transport Protocol (RTP) data stream feature to a forwarding plane;
   learning an RTP packet which is delivered by the forwarding plane conforming to the RTP data stream feature;
   judging an RTP data stream to be a determined RTP data stream based on the RTP packet learned;
   identifying and monitoring the determined RTP data stream to obtain control strategy of QoS of the determined RTP data stream; and
   delivering the control strategy of the QoS of the determined RTP data stream to the forwarding plane so that the forwarding plane manipulates QoS of the determined RTP data stream based on the control strategy of QoS;
   wherein the identifying and monitoring the determined RTP data stream further comprises:
   obtaining information of the determined RTP data stream;
   determining a feature of an RTP Control Protocol (RTCP) packet corresponding to the determined RTP data stream;
   delivering the feature of the RTCP packet to the forwarding plane; and
   when receiving the RTCP packet from the forwarding plane conforming to the feature, analyzing the RTCP packet to obtain the control strategy of the determined RTP data stream; and wherein the RTCP packet is obtained and replicated by the forwarding plane according to the feature.

2. The method of claim 1, wherein the learning process and the judging process further comprises:
   analyzing the RTP packet which is delivered by the forwarding plane;
   obtaining field information contained in a header of the RTP packet; and
   judging the RTP data stream to be the determined RTP data stream based on the field information.

3. The method of claim 2, wherein after obtaining field information contained in the header of the RTP packet, the method further comprising:
   establishing a learning entry; wherein the method further comprises:
   checking version number contained in the RTP packet;
   when the version number conforms to a preset value, searching if the learning entry of the RTP data stream with the version number has been established;
   if no, then establishing the learning entry of the RTP data stream with the version number, and storing the field information correspondingly, and setting an update number as an initial number; or
   if yes, then comparing the field information with a corresponding value in the entry according to a preset rule; when the comparison result is yes, updating the corresponding value in the entry, and adding one to an update number; when the comparison result is no, deleting the entry; and
   judging the RTP data stream to be the determined RTP data stream when the update number reaches a determining threshold.

4. The method of claim 3, wherein the comparing the field information with the corresponding value in the entry according to the preset rule further comprises:
   checking if a Sequence Number (SN) value and timestamp value in the RTP packet delivered by the forwarding plane are greater than the SN value and timestamp value in the entry, and if a quintet of parameters in the RTP packet delivered by the forwarding plane is the same as the quintet of parameters in the entry.

5. The method of claim 3, further comprising:
   checking the learning entry and deleting the learning entry if it is not updated for a certain period.

6. The method of claim 5, wherein the checking the learning entry and deleting the learning entry if it is not updated for a certain period further comprises:
   traversing the learning entry;
   comparing time of the timestamp value with current time of the traversing process; and
   if the comparison result is greater than a threshold of aging time, deleting the learning entry; otherwise traversing a next learning entry.

7. The method of claim 6, further comprising:
   setting periodic processing, timer and processing quantity; and
   when the predetermined period comes, processing entries of the set processing quantity.

8. The method of claim 1, wherein learning the RTP packet which is delivered by the forwarding plane conforming to the RTP data stream feature further comprises:
   adding a mirror symbol to the RTP packet which conforms to the RTP data stream feature by the forwarding plane; and replicating and delivering the replicated RTP packet with the mirror symbol by the forwarding plane.

9. The method of claim 8, wherein, replicating and delivering the replicated RTP packet with the mirror symbol by the forwarding plane; and transferring, by the forwarding plane, the original RTP packet.

10. The method of claim 1, wherein the control strategy of QoS is determined by user's configuration or a control plane configuration.

11. The method of claim 1, wherein the RTP data stream feature is delivered to the forwarding plane in a feature template; wherein the feature template comprises one or more of the following:
    (1) a plurality of bytes of the RTP data stream, wherein the plurality of bytes comprise User Datagram Protocol (UDP) type value and version number of RTP header, or Transmission Control Protocol (TCP) type value and version number of RTP header;
    (2) port number of UDP or TCP, wherein the port number is configured to determine the RTP data stream;
    (3) Access Control List (ACL) entry, wherein the ACL entry is configured to determine the RTP data stream.

12. The method of claim 1, wherein the RTP packet comprises a header and the length of the RTP packet is fixed.

13. The method of claim 1, wherein delivering by the forwarding plane is controlled with committed access rate (CAR).

14. An apparatus for operating Quality of Service (QoS) based on stream, comprising:
    a forwarding plane, configured to communicate with a control plane; wherein:
    the control plane is configured to deliver a Real-Time Transport Protocol (RTP) data stream feature to the forwarding plane, learn an RTP packet which is delivered by the forwarding plane according to the RTP data stream feature, and judge an RTP data stream to be a determined RTP data stream based on the RTP packet learned;
    the control plane is further configured to obtain information of the determined RTP data stream, determine a feature of an RTP Control Protocol (RTCP) packet corresponding to the determined RTP data stream, and deliver the feature of the RTCP packet to the forwarding plane; wherein when receiving the RTCP packet from the forwarding plane conforming to the feature, the control plane is further configured to analyze the RTCP packet to obtain control strategy of the determined RTP data stream; and wherein the RTCP packet is obtained and replicated by the forwarding plane according to the feature;

the control plane is further configured to deliver the control strategy of the QoS of the determined RTP data stream to the forwarding plane;

the forwarding plane is configured to deliver the RTP packet conforming to the RTP data stream feature which is delivered by the control plane to the forwarding plane; and the forwarding plane is further configured to manipulate QoS of the determined RTP data stream based on the control strategy of the QoS.

15. The apparatus of claim 14, wherein the forwarding plane is further configured to add a mirror symbol to the RTP packet which conforms to the RIP data stream feature by the forwarding plane, replicate the RTP packet with the mirror symbol to the control plane, and transfer the original RTP packet.

16. The apparatus of claim 14, wherein the control plane is further configured to analyze the RTP packet which is delivered by the forwarding plane, obtain field information contained in a header of the RTP packet, and judge the RTP data stream to be the determined RTP data stream based on the field information.

17. The apparatus of claim 16, wherein after the control plane obtains field information contained in the header of the RTP packet, the control plane is further configured to establish a learning entry; wherein:

the control plane is further configured to check version number contained in the RTP packet; and when the version number conforms to a preset value, search if there has established the learning entry of the RTP data stream with the version number;

if no, then establish the learning entry of the RTP data stream with the version number, and store the field information correspondingly, and set an update number as an initial number; or if yes, then compare the field information with a corresponding value in the entry according to a preset rule; when the comparison result is yes, update the corresponding value in the entry, and add one to an update number; when the comparison result is no, delete the entry; and judge the RTP data stream to be the determined RTP data stream when the update number reaches a determining threshold.

18. A system for operating Quality of Service (QoS) based on stream, comprising:

a control device, configured to communicate with a forwarding device; wherein the control device is configured to deliver a Real-Time Transport Protocol (RTP) data stream feature to the forwarding device, learn an RTP packet which is delivered by the forwarding device according to the RTP data stream feature, and judge the RTP data stream to be a determined RTP data stream based on the RTP packet learned;

the control device is further configured to obtain information of the determined RTP data stream, determine a feature of an RTP Control Protocol (RTCP) packet corresponding to the determined RTP data stream, and deliver the feature of the RTCP packet to the forwarding device; wherein when receiving the RTCP packet from the forwarding device conforming to the feature, the control device is further configured to analyze the RTCP packet to obtain control strategy of the determined RTP data stream; and wherein the RTCP packet is obtained and replicated by the forwarding device according to the feature; and the control device is further configured to deliver the control strategy of the QoS of the determined RTP data stream to the forwarding device so that the forwarding device manipulates QoS of the determined RTP data stream based on the control strategy of the QoS.

19. The system of claim 18, wherein the control device is further configured to analyze the RTP packet which is delivered by the forwarding device; and obtain field information contained in a header of the RTP packet; and judge the RTP data stream to be the determined RTP data stream based on the field information.

* * * * *